(12) United States Patent
Raaijmakers et al.

(10) Patent No.: US 10,595,466 B2
(45) Date of Patent: Mar. 24, 2020

(54) BALER

(71) Applicant: KUHN-GELDROP BV, Geldrop (NL)

(72) Inventors: Jaap Johannes Wilhelmus Raaijmakers, Leende (NL); Theodorus Antonius Tijsen, Budel (NL)

(73) Assignee: KUHN-GELDROP BV, Geldrop (NL)

( * ) Notice: Subject to any disclaimer, the term of this patent is extended or adjusted under 35 U.S.C. 154(b) by 1083 days.

(21) Appl. No.: 14/904,904

(22) PCT Filed: Jul. 9, 2014

(86) PCT No.: PCT/EP2014/064710
§ 371 (c)(1),
(2) Date: Jan. 13, 2016

(87) PCT Pub. No.: WO2015/007591
PCT Pub. Date: Jan. 22, 2015

(65) Prior Publication Data
US 2016/0135376 A1  May 19, 2016

(30) Foreign Application Priority Data
Jul. 17, 2013 (GB) .................................. 1312757.6

(51) Int. Cl.
*A01F 15/07* (2006.01)
*A01F 15/18* (2006.01)

(52) U.S. Cl.
CPC ............. *A01F 15/18* (2013.01); *A01F 15/07* (2013.01); *A01F 2015/077* (2013.01); *A01F 2015/0795* (2013.01); *A01F 2015/186* (2013.01)

(58) Field of Classification Search
CPC ...... A01F 15/18; A01F 15/07; A01F 15/0705; A01F 2015/077; A01F 2015/186;
(Continued)

(56) References Cited

U.S. PATENT DOCUMENTS 4,581,879 A * 4/1986 Anstey .................... A01F 15/07
100/88
4,910,949 A   3/1990 Meyer
(Continued)

FOREIGN PATENT DOCUMENTS

EP   0 152 085 A2   8/1985

OTHER PUBLICATIONS

International Search Report and Written Opinion dated Mar. 11, 2015 for PCT/EP2014/064710 filed on Jul. 9, 2014.

*Primary Examiner* — Jimmy T Nguyen
(74) *Attorney, Agent, or Firm* — Oblon, McClelland, Maier & Neustadt, L.L.P.

(57) ABSTRACT

A roller for a variable chamber round baler includes an axle configured to be mounted to a mounting element of the baler, a rotary bearing mounted on the axle, and a roller casing supported by the bearing for rotation around the axle. The roller includes a first seal plate adjacent an end of the roller casing mounted in a fixed position relative to the axle and extending radially outwards towards the roller casing, and a second seal plate located between the first seal plate and the bearing mounted for rotation with the roller casing and extending radially inwards towards the axle and located axially inwards from the first seal plate to provide a space between the first and second seal plates. The first seal plate includes an opening in a lower portion through which waste crop material can escape outwards from the space between the first and second seal plates.

14 Claims, 4 Drawing Sheets

(58) Field of Classification Search
CPC ........ A01F 2015/0795; A01F 2015/079; A01F 2015/0833; A01F 2015/085; A01F 15/0833; A01F 15/085; B21B 2203/12; D21G 1/02; B30B 11/208; B65H 2404/134; B65H 2404/1342; B65H 2404/13421; B65H 2404/1317
USPC ............... 100/87, 88, 89; 492/16, 47, 48, 60
See application file for complete search history.

(56) References Cited

U.S. PATENT DOCUMENTS

| | | | |
|---|---|---|---|
| 5,191,833 A | 3/1993 | Clevenger, Jr. | |
| 5,347,801 A * | 9/1994 | McIlwain | A01F 15/07 100/89 |
| 5,603,206 A * | 2/1997 | Horchler, Jr. | A01F 15/07 100/88 |
| 6,170,246 B1 * | 1/2001 | Underhill | A01F 15/07 56/341 |

* cited by examiner

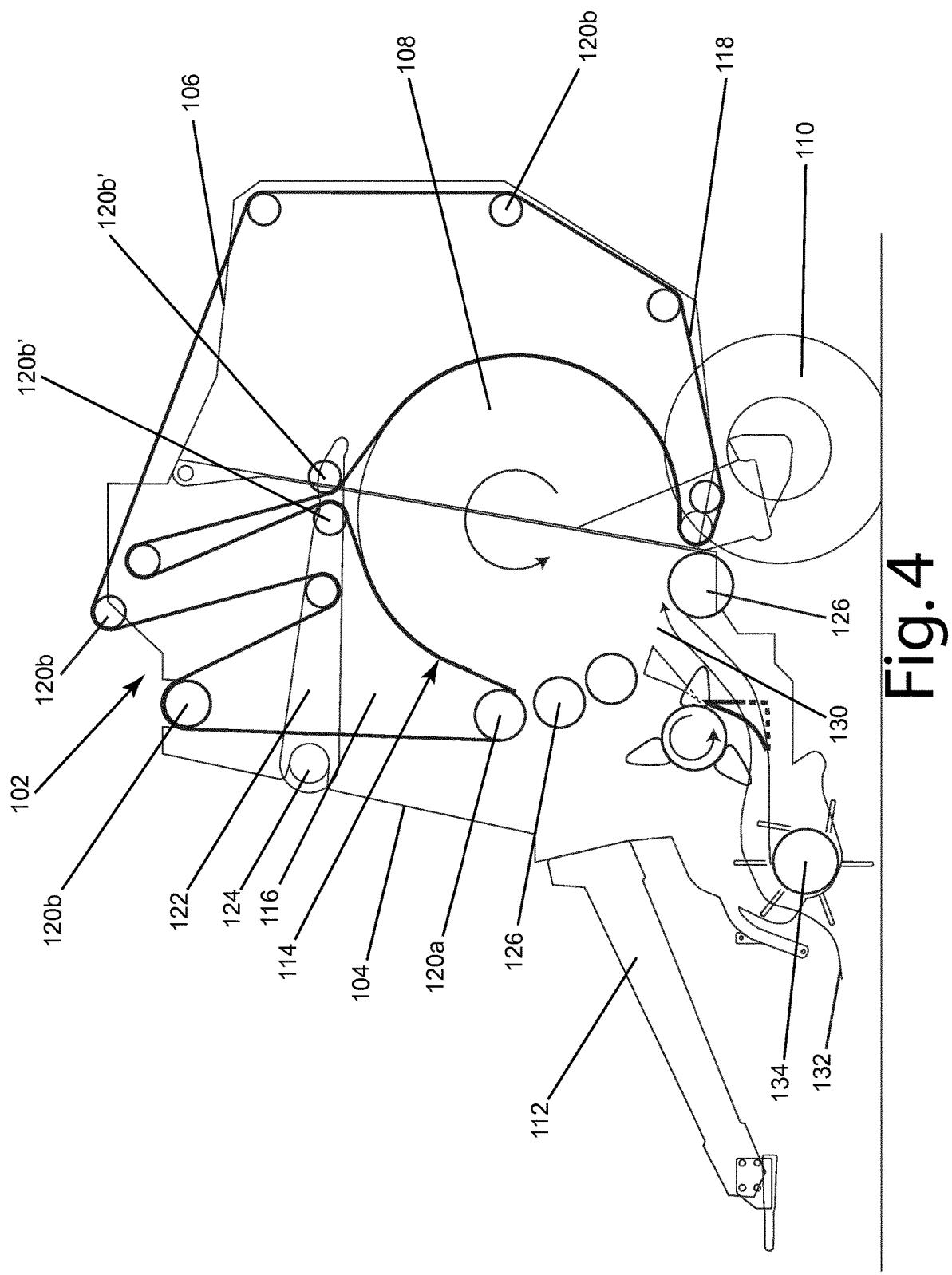

BALER

BACKGROUND

The present invention relates to a baler and in particular but not exclusively to a baler for baling an agricultural crop. The invention also relates to a roller for use in a variable chamber round baler.

Round balers for agricultural produce are well known from for instance EP2269440 and U.S. Pat. No. 8,037,814. These balers gather agricultural crop material from the ground with a pick up mechanism and, optionally after cutting the material, the material is forwarded to a bale chamber that compresses the material to form a round bale. After compression the bale is wrapped with binding material, for example netting, twine or film, to keep the material under pressure and to maintain its shape. After binding the bale is ejected from the bale chamber.

Balers can be of various types including fixed chamber balers that produce a bale of a fixed diameter, and variable chamber balers which can produce bales of different diameters. The variable chamber balers usually make use of a set of endless belts running over rollers as in the prior art mentioned above. This invention relates particularly but not exclusively to this latter type of baler.

A problem with these variable chamber balers is that the crop material to be compressed has a tendency in some conditions to wind around the rollers on which the belts are running and become entangled. This can also occur at the ends of the roller where the roller is attached to the side walls of the baler or to tensioning arms that keep the belts under tension.

The entangled crop material can cause a lot of friction and this can produce a lot of heat. The crop material can also penetrate through one or more of the seals that protect the bearing inside the roller. If the crop material penetrates through the seals and gets entangled in the bearing the material may in the end destroy the bearing.

BRIEF SUMMARY

It is an object of the invention to provide improvements that individually and/or in combination help to mitigate one or more of the problems described above.

According to one embodiment of the invention there is provided a roller for a variable chamber round baler, the roller including an axle configured to be mounted to a mounting element of the baler, a rotary bearing mounted on the axle, and a roller casing supported by the bearing for rotation around the axle, wherein the roller includes a first seal plate adjacent an end of the roller casing that is mounted in a fixed position relative to the axle and extends radially outwards towards the roller casing, and a second seal plate located between the first seal plate and the bearing that is mounted for rotation with the roller casing and extends radially inwards towards the axle, wherein the second seal plate is located axially inwards from the first seal plate to provide a space between the first and second seal plates, and wherein the first seal plate includes an opening through which waste crop material can escape outwards from the space between the first and second seal plates.

The roller therefore includes first and second seal plates located axially outwards from the bearing, which provide a tortuous path from the outside to the inside of the roller. This makes it very difficult for waste crop material to enter the inside of the roller and reach the bearing. Furthermore, the first and second plates are separated axially from one another, for example by a distance of about 10-20 mm, providing a space between the first and second seal plates. Any waste crop material that gets past the first seal plate will accumulate in this space and will then be ejected through the opening in the first seal plate. This ensures that there is very little possibility of waste crop material getting past the second seal plate and becoming entangled in the bearing.

Preferably, the opening in the first seal plate is located in a lower portion thereof. Optionally, the opening may be displaced by about 40°-60° from the lowest portion of the plate.

The axle may be either a full axle or a stub axle.

Advantageously, the second seal plate includes a projection that extends axially outwards from an outer face of the second seal plate, said projection being configured to urge waste crop material outwards through the opening as the second seal plate rotates. This projection therefore continuously ejects waste crop material from the space between the first and second seal plates, preventing a substantially quantity of material from accumulating in this space.

Advantageously, the projection is configured to chop waste crop material in the space between the first and second seal plates. Any large pieces of waste material in the space between the first and second seal plates are therefore chopped into smaller pieces, which can then be ejected relatively easily through the opening in the first seal plate. Preferably, the projection cooperates with the edges of the opening to chop the waste crop material.

Advantageously, the first seal plate has a diameter that provides an annular gap between the periphery of the first seal plate and an inner circumference of the roller casing, wherein said gap has a radial width in the range 0.2-1.0 mm. The gap is therefore very small to prevent large pieces of waste crop material from entering the space between the first and second seal plates.

Advantageously, the roller includes a third seal plate between the second seal plate and the bearing, wherein the third seal plate is mounted in a fixed position relative to the axle and extends radially outwards towards the roller casing. The third seal plate increases the length of the tortuous path from the outside to the bearing and provides an extra barrier to prevent the ingress of waste crop material to the bearing.

Advantageously, the roller includes a scraper element configured to be mounted to the mounting element of the baler, said scraper element extending axially inwards from the mounting element past an end region of the roller casing and being positioned adjacent the circumference of the roller casing to scrape away waste crop material adhering to the end region of the roller casing. The scraper removes crop material adhering to the outside of the roller casing. This is important as otherwise the crop material could be drawn inwards by rotation of the roller into the gap between the end of the roller and the mounting element, where it could accumulate and eventually be forced into the annular gap between the roller casing and the first seal plate. Scraping away any waste crop material adhering to the end region of the roller casing is also important to ensure that waste material ejected through the opening in the first seal plate is able to fall away freely without collecting in the vicinity of the roller.

According to another aspect of the invention there is provided a roller for a variable chamber round baler, wherein the roller includes an axle configured to be mounted to a mounting element of the baler, a rotary bearing mounted on the axle, and a roller casing supported by the bearing for rotation around the axle, wherein the roller includes a scraper element configured to be mounted to the mounting element of the baler, said scraper element extending axially inwards from the mounting element past an end region of the roller casing and being positioned adjacent the circumference of the roller casing to scrape away waste crop material adhering to the end region of the roller casing.

According to this aspect of the invention the baler includes a scraper element that scrapes away waste crop material adhering to the end region of the roller casing. As previously indicated, this is important as otherwise the crop material could be drawn inwards by rotation of the roller into the gap between the end of the roller and the mounting element, where it could accumulate and eventually be forced into the annular gap between the roller casing and the first seal plate.

Advantageously, the roller casing includes a projection that extends axially outwards from the end region of the roller casing, said projection being configured to scrape away waste crop material adhering to the mounting element as the roller casing rotates. Again, this is important to ensure that waste material ejected through the opening in the first seal plate is able to fall away freely without collecting in the vicinity of the roller.

Advantageously, the projection that extends axially outwards from the end region of the roller casing is configured to cooperate with the scraper element to chop waste crop material adjacent the end region of the roller casing. Any large pieces of waste material accumulating in the vicinity of the end region of the roller can thus be chopped into smaller pieces, allowing them to fall away more easily.

Advantageously, the roller includes a first seal plate adjacent an end of the roller casing that is mounted in a fixed position relative to the axle and extends radially outwards towards the roller casing, and a second seal plate located between the first seal plate and the bearing that is mounted for rotation with the roller casing and extends radially inwards towards the axle, wherein the second seal plate is located axially inwards from the first seal plate to provide a space between the first and second seal plates, and wherein the first seal plate includes an opening in a lower portion thereof through which waste crop material can escape outwards from the space between the first and second seal plates.

The first and second seal plates provide a tortuous path from the outside to the inside of the roller, making it very difficult for waste crop material to enter the inside of the roller and reach the bearing. Waste crop material that accumulates in the space between the first and second seal plates is ejected through the opening in the first seal plate. Scraping away material from the end of the bearing ensures that the ejected material is able to fall away freely without collecting in the vicinity of the roller.

The first and second seal plates provide a tortuous path from the outside to the inside of the roller. This makes it very difficult for waste crop material to enter the inside of the roller and reach the bearing. Furthermore, the first and second plates are separated axially from one another, for example by a distance of about 10-20 mm, providing a space between the first and second seal plates. Any waste crop material that gets past the first seal plate will accumulate in this space and will then be ejected through the opening in the first seal plate. This ensures that there is very little possibility of waste crop material getting past the second seal plate and becoming entangled in the bearing.

Advantageously, the second seal plate includes a projection that extends axially outwards from an outer face of the second seal plate, said projection being configured to urge waste crop material outwards through the opening as the second seal plate rotates. The projection continuously ejects waste crop material from the space between the first and second seal plates, preventing a substantially quantity of material from accumulating in this space Advantageously, the projection is configured to chop waste crop material in the space between the first and second seal plates. Any large pieces of waste material in the space between the first and second seal plates are therefore chopped into smaller pieces, which can then be ejected relatively easily through the opening in the first seal plate. Preferably, the projection cooperates with the edges of the opening to chop the waste crop material.

Advantageously, the first seal plate has a diameter that provides an annular gap between the periphery of the first seal plate and an inner circumference of the roller casing, wherein said gap has a radial width in the range 0.2-1.0 mm. The gap is very small to prevent large pieces of waste crop material from entering the space between the first and second seal plates Advantageously, the roller includes a third seal plate between the second seal plate and the bearing, wherein the third seal plate is mounted in a fixed position relative to the axle and extends radially outwards towards the roller casing. The third seal plate increases the length of the tortuous path from the outside to the bearing and provides an extra barrier to prevent the ingress of waste crop material to the bearing.

Advantageously, the roller includes a vent opening configured to allow air to vent in and out of a space enclosed by the roller casing and the bearing. This vent opening ensures that the pressure inside the roller is equalized with the atmospheric pressure, and so prevents waste crop material from by sucked into the inside of the roller by a partial vacuum within the roller.

According to another aspect of the invention there is provided a roller for a variable chamber round baler, the roller including an axle configured to be mounted to a mounting element of the baler, a rotary bearing mounted on the axle, and a roller casing supported by the bearing for rotation around the axle, wherein the roller includes a vent opening configured to allow air to vent in and out of a space enclosed by the roller casing and the bearing.

As previously stated, the vent opening ensures that the pressure inside the roller is equalized with the atmospheric pressure, and so prevent waste crop material from by sucked into the inside of the roller by a partial vacuum within the roller.

According to another aspect of the invention there is provided a variable chamber round baler that includes a bale chamber and a plurality of rollers that define the shape of the bale chamber, wherein at least one of the rollers comprises a roller according to any one of the preceding statements of invention. The baler overcomes many of the problems associated with the build-up of waste crop materials around the rollers of known variable chamber round balers.

Advantageously, said at least one roller is an idler roller. Alternatively, the roller may be a drive roller.

Advantageously, said at least one roller carries a plurality of belts that form the bale chamber of the baler. Alternatively, the roller may be a free roller, which does not carry or support a belt.

Advantageously, said at least one roller is mounted to a mounting element of the baler, said mounting element comprising a side wall or a tensioning arm, or any other suitable supporting element of the baler.

BRIEF DESCRIPTION OF THE DRAWINGS

An embodiment of the invention will now be described by way of example with reference to the accompanying drawings, wherein:

FIG. 4 is a partially sectional side view of a variable chamber round baler.

DETAILED DESCRIPTION

Figure 1:
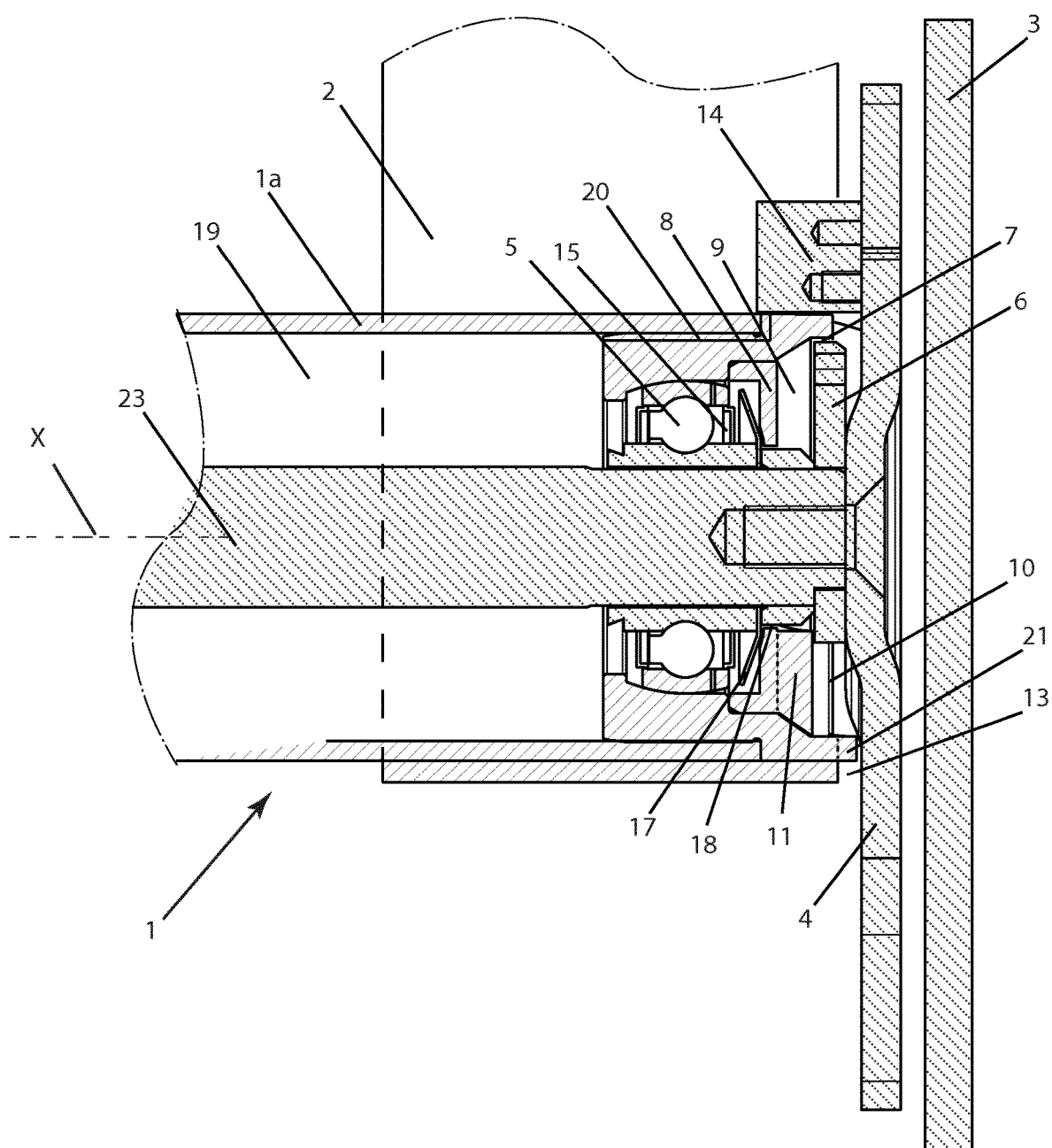
FIG. 1 is a side sectional view through an end part of a roller of a variable chamber round baler.

Referring first to FIG. 4, this shows the main components of a variable chamber round baler 102. The baler 102 includes a housing 104 having a tailgate 106 that can pivot open to release a bale 108. The baler 102 is mounted on wheels 110 and has a tow bar 112 allowing it to be towed by an agricultural vehicle such as a tractor (not shown). The baler 102 is configured to be driven from the power take off unit (not shown) of the tractor.

The baler 102 includes a bale chamber 114 within which a round (cylindrical) bale 108 of crop material can be formed. The shape of the bale chamber 114 is defined by the side walls 116 of the housing 104, 106 and by a set of endless belts 118 that pass around a set of rollers 120a, 120b. At least one of the rollers is a drive roller 120a that is driven via the power take-off unit, and which drives the belts 118 causing them to rotate around the rollers 120a, 120b. The other rollers are undriven idler rollers 120b that rotate with the belts 118. Two of the idler rollers comprise tensioning rollers 120b', which are mounted on a tensioning arm 122. The tensioning arm 122 can be pivoted about a pivot point 124 to increase or decrease the diameter of the bale chamber 114 defined by the belts 118.

Optionally, the bale chamber 114 may be defined in part by one or more free rollers 126, which do not engage the belts 118 and may for example be located on either side of a feed opening 130 through which crop material 132 is fed into the bale chamber 114 to be baled. These free rollers 126 may be either driven or undriven. The baler also includes a pick-up mechanism 134 for picking up crop material 132 from the ground and feeding it into the bale chamber 114. The crop material is circulated within the bale chamber 114 by the rotating belts 118 and the rollers 120a, 120b, 126, thereby forming a round bale 108. When the bale 108 has been formed it is bound with a suitable binding material, typically twine, net or film, and then ejected from the bale chamber onto the ground through by opening the tailgate 106.

All the aforesaid features are conventional and will not therefore be described in further detail.

The present invention relates specifically to the structure of the rollers 120a, 120b, 120b' and 126 that define the bale chamber 114. It should be understood that the invention can be applied to any one or more of these rollers, including the driven roller 120a, the undriven idler rollers 120b, 120b' and the free rollers 126. However, it is particularly useful with the idler rollers 120b, 120b' as these rollers tend to suffer more severely from the problems associated with entangled waste crop materials. The structure of the roller will now be described in more detail with reference to FIGS. 1-3, wherein the roller will be referred to generally as roller 1. The belt 2, the sidewall 3, and the tensioning arm 4 shown in FIGS. 1-3 correspond respectively to the belts 118, the sidewalls 116, and the tensioning arm 122 of the baler 102 shown in FIG. 4.

Figure 2:
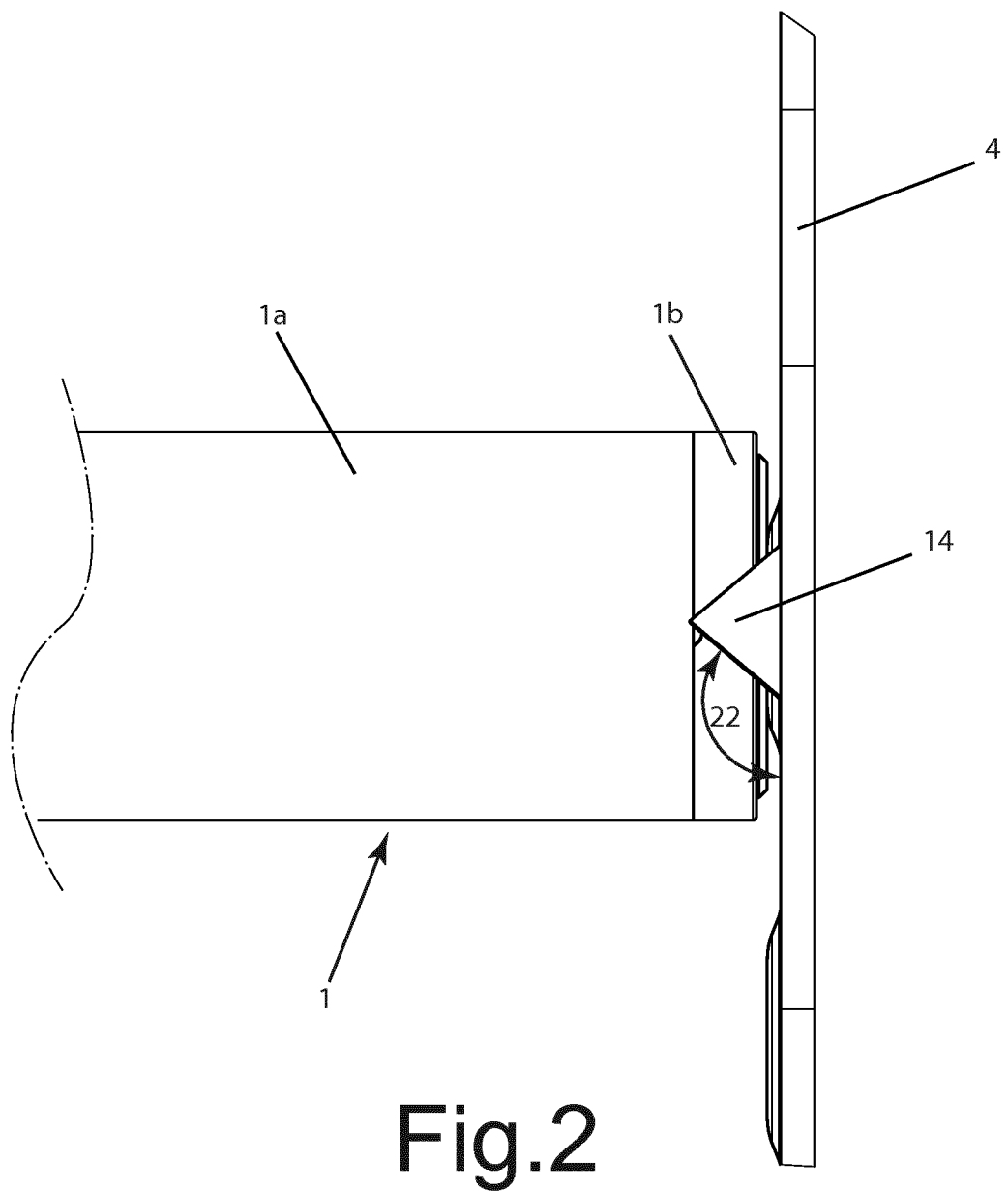
FIG. 2 is a plan view from above showing the end part of the roller shown in FIG. 1.
Figure 3:
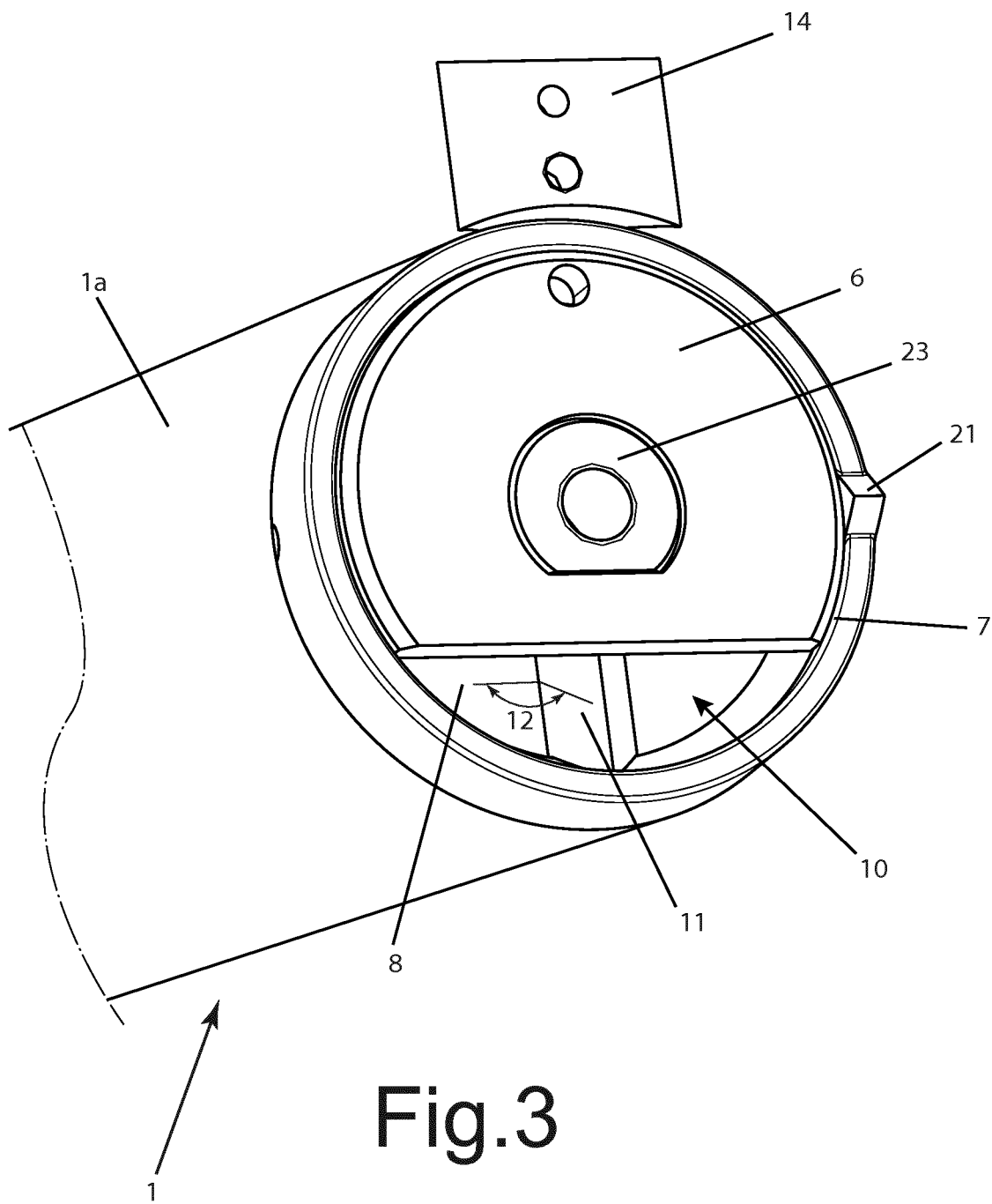
FIG. 3 is an isometric view showing the end part of the roller shown in FIG. 1.

Although FIGS. 1-3 show only one end of a roller 1, it should be understood that the roller will normally have a similar structure at its other end.

The baler includes at least one roller 1 that is rotatable about an axis X and over which a belt 2 runs, wherein the roller 1 comprises:

a substantially cylindrical roller casing 1a, an axle 23 that is fixedly connected to either the side wall 3 or the tensioning arm 4, a bearing 5 on the axle 23 and inside the roller casing 1a and adjacent to the side wall 3 or tensioning arm 4, and a first seal plate 6 that is slightly smaller in diameter than the inner diameter of the roller casing 1a, which is fixedly connected to the axle 23 and positioned inside the roller casing 1a and also towards an end of the roller casing 3.

It should be understood that although the axle 23 shown in FIG. 1 is a full axle that extends through the entire length of the roller 1, the axle 23 may be either a full axle or a stub axle that is fixedly connected to either the side wall 3 or the tensioning arm 4. It should also be understood that although the axle 23 shown in FIG. 1 is connected to the tensioning arm 4, it may alternatively be connected to a side wall 3 or any other suitable support member of the baler.

The annular gap 7 between the outside diameter of the first seal plate 6 and the inside of the roller casing 1a is small (typically about 0.2-1 mm) in order to minimize the quantity of bale material passing through the gap 7 into the interior of the roller 1.

A second seal plate 8 is fixedly connected to the roller casing 1a at a position more axially inward from the end of the roller 1 than the first seal plate 6, whereby it forms a space 9 together with the first seal plate 6, the roller casing 1a and the axle 23. The axial distance between the first and second seal plates 6, 8 is about 10-20 mm.

The lower part (in the vertical direction) of the first seal plate 6 is cut out to provide an opening 10, so that crop material that has entered into the space 9 through the annular gap 7 between the roller casing 1a and the first seal plate 6 can escape through this opening 10. Optionally, the opening may be displaced by about 40°-60° from the lowest portion of the plate. In order to urge the entered crop material towards the opening 10, the second seal plate 8 is provided with an outwardly projecting protrusion 11. The protrusion 11 preferably has a height in the axial direction that is substantially equal to the distance between the first and second seal plates 6, 8 (e.g. a height of 10-20 mm). The top of the protrusion is thus adjacent to the first plate 6 and provides a cutting action to chop any crop material in the space 9 as the second seal plate 8 rotates.

Any material that has entered into the space 9 between the first and second seal plates 6,8 will first fall to the bottom of the space 9 and when adjacent the opening 10 of the space it will be ejected from the space 9 by the rotating protrusion 11. When not ejected completely any material remaining within the space 9 will be chopped between the protrusion 11 and the edge of the opening 10 as the second seal plate rotates, owing to the proximity between the top of the protrusion 11 and the inner face of the first sealing plate 6. This chopping action will also prevent the material from sticking inside the space 9 and therefore it will be ejected more easily. The front surface of the protrusion 11 preferably is not perpendicular to the main surface of the second seal plate 8, but is at an obtuse angle 12, as illustrated in FIG. 3. Because of this angle 12 and the reaction forces on the material to be ejected, the material is better urged towards the opening 10. Preferably the angle 12 is between 120 and 135 degrees relative to the end surface of the second seal plate 8.

Preferably the material urged out through the described opening 10 is kept within the side walls 3 of the bale chamber and/or the tensioning arms 4 of baler so as to avoid problems at other parts of the baler e.g. the driveline and to avoid the need for holes in the side wall, which will cause a reduction of strength or cause an extra loss of bale material to be compressed.

To allow the material to fall freely out of the opening 10 as described above the first seal plate 6 and the roller 1 are preferably positioned 5-20 mm from the side wall 3 or the tensioning arm 4, providing an end gap 13. Through this end gap 13 the chopped material can fall freely.

Preferably there is provided a scraper 14 fixedly connected to the side wall 3 or the tensioning arm 4, which prevents the entanglement of material onto the roller 1 at the end part 1b of the roller casing adjacent to the side wall 3 or the tensioning arm 4. This entangled material can block the end gap 13 and therefore prevent the cleaning of the described space 9. The scraper 14 is positioned adjacent to the outside circular surface of the roller casing 1a and preferably protrudes 10-50 mm beyond the inside face of the side wall 3 or tensioning arm 4. Preferably the surface of the scraper 14 that contacts the entangled material is set at an obtuse angle 22 relative to the surface of the sidewall 3 or the tensioning arm 4, as shown in FIG. 2. Preferably, the angle 22 between the sidewall and the contacting surface of the scraper 14 is 120-135 degrees.

Preferably, the roller 1 is provided with a protrusion 21 that extends in the axial direction from the end of the roller casing 1a. The protrusion 21 points in the direction of the sidewall 3 and/or tensioning arm 4. This protrusion 21 will urge material that has fallen out of opening 10 in the gap 13 in a circular direction if stuck between roller end and the sidewall 3 or tensioning arm 4. Also material is urged in the direction of the scraper 14. This material will then be cut between the scraper 14 and the protrusion 21 on the axial end of the roller 1. When the material has been cut it is more easily ejected. Preferably, the surface of the protrusion 21 is set at an obtuse angle relative to the outer surface of the first seal plate 6, as shown in FIG. 3. Preferably, the angle between the surface of the protrusion 21 and the outer end surface of the first seal plate 6 is 120-135 degrees. Preferably, the angles and shapes of the first protrusion 11, the scraper 14 and the second protrusion 21 are similar.

To avoid the risk that material captured in the space 9 described above will be forced in the direction of the seal 15 of bearing 5 through the gap between the second seal plate 8 and the axle 23, preferably a third seal plate 17 is fixedly connected to the axle 23 and positioned between bearing 5 and second seal plate 8. This third seal plate 17 makes the travel distance substantially longer from the gap 18 between the axle and the second seal plate 8 towards the seal of the bearing.

Preferably also the space 19 inside the roller 1 between the roller casing 1a and the axle 23 has an vent opening 20 between the roller casing 1a and the bearing 5, which opens to the outside of the roller bypassing the bearing seal 15. This allows air to vent in and out of the space between the axle 23 and the roller casing 1a and prevents the risk that due to heat or changes in atmospheric pressure the pressure inside the roller and the bearing will create an under pressure or over pressure. Due to this over pressure or under pressure, air, moisture and/or dirt can be forced through the bearing seal 15. Especially, the presence of moisture and dirt inside the seals of the bearing and in direct contact the balls and ring of the bearing can destroy the bearing.

According to one aspect of the invention there is provided a variable chamber baler that includes a plurality of pressing elements, wherein at least one of the pressing elements includes a bearing configured to allow rotation of the pressing element, and first and second seal elements configured to prevent bale material from entering the bearing, wherein said first and second seal elements provide a space in which bale material can collect, and the first seal element includes an opening through which bale material can exit the space. Preferably, the second seal element includes a protrusion for ejecting bale material through the opening.

The invention claimed is:

1. A roller for a variable chamber round baler, the roller comprising:
    an axle configured to be mounted to a mounting element of the baler;
    a rotary bearing mounted on the axle; and
    a roller casing supported by the bearing for rotation around the axle;
    wherein the roller includes a first seal plate adjacent an end of the roller casing, wherein the first seal plate is mounted in a fixed position relative to the axle and extends radially outwards towards the roller casing, and a second seal plate located between the first seal plate and the bearing, wherein the second seal plate is mounted for rotation with the roller casing and extends radially inwards towards the axle;
    wherein the second seal plate is located axially inwards from the first seal plate to provide a space between the first and second seal plates; and
    wherein the first seal plate includes an opening through which waste crop material can escape outwards from the space between the first and second seal plates to outside of the roller.

2. The roller according to claim 1, wherein the second seal plate includes a projection that extends axially outwards from an outer face of the second seal plate, the projection configured to urge waste crop material outwards through the opening as the second seal plate rotates.

3. The roller according to claim 2, wherein the projection is configured to chop waste crop material in the space between the first and second seal plates.

4. The roller according to claim 1, wherein the first seal plate has a diameter that provides an annular gap between the periphery of the first seal plate and an inner circumference of the roller casing, wherein the gap has a radial width in a range of 0.2-1.0 mm.

5. The roller according to claim 1, further comprising a third seal plate between the second seal plate and the bearing, wherein the third seal plate is mounted in a fixed position relative to the axle and extends radially outwards towards the roller casing.

6. The roller according to claim 1, wherein an axial distance between the first seal plate and the second seal plate is 10-20 mm.

7. The roller according to claim 2, wherein a height of the projection of the second seal plate is 10-20 mm.

8. The roller according to claim 2, wherein the projection forms an obtuse angle with the outer face of the second seal plate.

9. The roller according to claim 8, wherein the obtuse angle is between 120 and 135 degrees.

10. A variable chamber round baler comprising a bale chamber and a plurality of rollers that define the shape of the bale chamber, wherein at least one of the rollers comprises:

an axle configured to be mounted to a mounting element of the baler; a rotary bearing mounted on the axle; and a roller casing supported by the bearing for rotation around the axle; wherein the roller includes a first seal plate adjacent an end of the roller casing, wherein the first seal plate is mounted in a fixed position relative to the axle and extends radially outwards towards the roller casing, and a second seal plate located between the first seal plate and the bearing, wherein the second seal plate is mounted for rotation with the roller casing and extends radially inwards towards the axle;

wherein the second seal plate is located axially inwards from the first seal plate to provide a space between the first and second seal plates; and wherein the first seal plate includes an opening through which waste crop material can escape outwards from the space between the first and second seal plates to outside of the roller.

11. The variable chamber round baler according to claim 10, wherein the at least one roller is an idler roller.

12. The variable chamber round baler according to claim 10, wherein the at least one roller carries a plurality of belts that form the bale chamber of the baler.

13. The variable chamber round baler according to claim 10, wherein the at least one roller is mounted to a mounting element of the baler, the mounting element comprising a side wall or a tensioning arm of the baler.

14. The variable chamber round baler according to claim 13, wherein the at least one roller includes a scraper element configured to be mounted to the mounting element of the baler, said scraper element extending axially inwards from the mounting element past an end region of the roller casing and being positioned adjacent the circumference of the roller casing to scrape away waste crop material adhering to the end region of the roller casing.

* * * * *